United States Patent Office 3,076,826
Patented Feb. 5, 1963

3,076,826
17α-(LOWER-ALKYL)-19-NOR-5(10)-ANDRO-STENE-3,17β-DIOLS
Raymond O. Clinton, North Greenbush Township, and Robert G. Christiansen, Schodak Center, N.Y., assignors to Sterling Drug Inc., New York, N.Y., a corporation of Delaware
No Drawing. Filed Aug. 20, 1957, Ser. No. 679,119
2 Claims. (Cl. 260—397.5)

This invention relates to new chemical compounds of the steroid series and in particular concerns a series of 3-X-17α-(lower-alkyl)-19-norandrosten-17β-ols having a double bond in the 5(10)-position, wherein X is a hydroxy radical, and to a process for the preparation of said compounds.

The compounds of the invention possess the following structural formula:

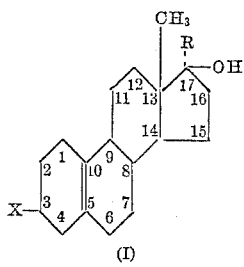

wherein X represents OH and R represents a lower-alkyl radical.

In the above general Formula I the symbol R represents a lower-alkyl radical, preferably having from one to about four carbon atoms. Thus R stands for such groups as methyl, ethyl, propyl, isopropyl, butyl, isobutyl, and the like.

The compounds of our invention are prepared according to the following reaction sequence:

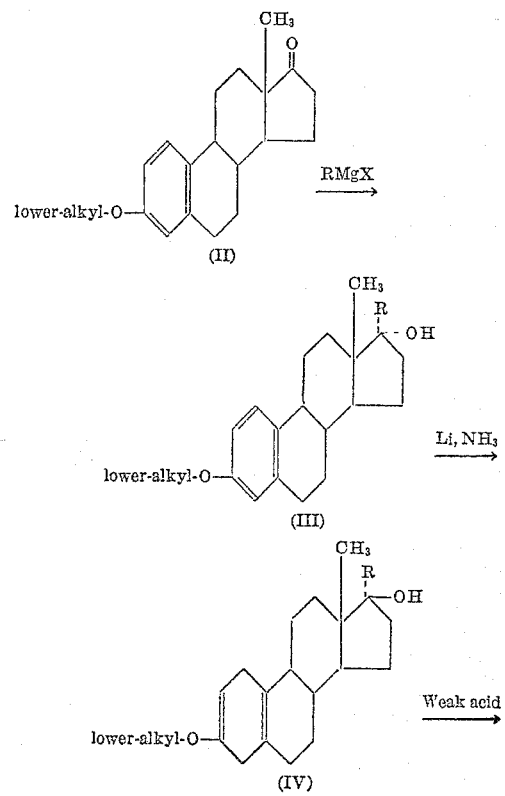

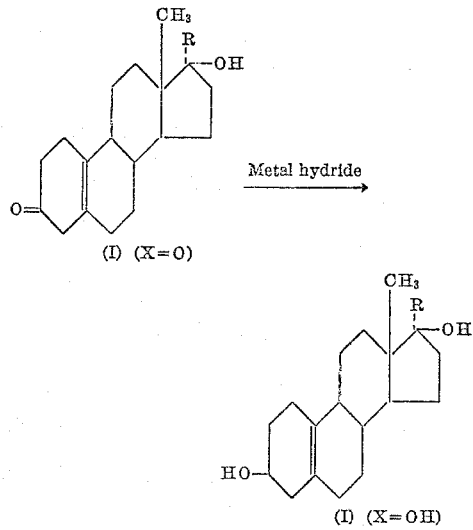

Estrone lower-alkyl ether (II) is alkylated at the 17-position with an alkylmagnesium halide in a conventional Grignard reaction to give a 17α-(lower-alkyl)-3,17β-estradiol 3-lower-alkyl ether (III). The latter is then reduced with lithium metal in liquid ammonia and alcohol to give a dihydrocompound (IV). Structure IV is an enol lower-alkyl ether which can be hydrolyzed under mild conditions, e.g., in the presence of a weak acid to give a compound having the Formula I where X represents an oxo radial, that is, a 17α-(lower-alkyl)-19-nor-5(10)-androsten-17β-ol-3-one. Metal hydride reduction of the latter gives a corresponding compound wherein X represents a hydroxy radical, that is, a 17α-(lower-alkyl)-19-nor-5(10)-androstene-3,17β-diol. The compounds of Formula III where R represents the ethyl group can alternatively be prepared by reacting estrone lower-alkyl ether with a metal derivative of acetylene in a Nef reaction, followed by catalytic hydrogenation of the resulting 17α-ethynyl derivative (III; R is C≡H).

The lower-alkyl radicals attached to oxygen in the 3-position of structures II, III and IV preferably have from one to about four carbon atoms, and thus can be methyl, ethyl, propyl, isopropyl, butyl, isobutyl, and the like.

The hydrolysis of the enol ether (IV) to the unsaturated ketone (I; X is O) is carried out by treating the enol ether with a weak acid in a lower-alkanol which acts as a solvent for the steroid. The use of strong acids should be avoided since these will cause rearrangement of the double bond from the 5(10)-position to the 4,5-position in conjugation with the oxo group. Any weak acid will serve the desired purpose, a preferred class being organic carboxylic acids which are appreciably soluble in lower-alkanols or aqueous lower-alkanols. An especially preferred weak acid is oxalic acid. The hydrolysis will take place at room temperature or can be carried out by means of gentle heating if desired.

The metal hydride reduction of the unsaturated ketones (I; X is O) to the corresponding unsaturated alcohols takes place in an inert solvent at room temperature or with gentle heating. Appropriate metal hydrides are lithium aluminum hydride, sodium borohydride, sodium hydride, and the like, the first named being a preferred reducing agent.

The structures of the compounds of the invention were proved by the mode of synthesis and are consistent with elementary analysis and ultraviolet and infrared spectra data. For example, the compounds of Formula I, where X is O=, absorb in the ultraviolet at about 280 mμ, and not at about 240 mμ, characteristic of conjugated, α,β- unsaturated ketones. Hence the double bond remaining after partial hydrogenation of the aromatic system in ring A must lie in the position unconjugated with the oxo group, i.e., in the 5(10)-position.

The following examples will further illustrate the invention without the latter being limited thereby.

EXAMPLE 1

(a) *17α-methyl-2,5(10)-estradiene-3,17β-diol 3-methyl ether* [IV; R is CH₃].—A 5-liter, three-necked, round bottomed flask was fitted with a Dry Ice condenser, a glass stirrer and an addition funnel. The system was flame-dried and 1300 cc. of liquid ammonia was added to the flask. There was then added a solution of 16.00 g. (0.0512 mole) of 17α-methyl-3,17β-estradiol 3-methyl ether [III; R is CH₃] in 1000 cc. of ether, followed by 8.00 g. (1.15 moles) of lithium wire in one inch portions. Over a period of one-half hour there was then added 175 cc. of absolute ethanol. The majority of the ammonia was allowed to evaporate, the solvent was removed on a steam bath, and ice water was added to the residue. The solid product was collected by filtration and combined with the product from another run starting from 16.00 g. of 17α-methylestradiol methyl ether. The combined product was dissolved in ether, and the ether solution was washed twice with 500 cc. of water and once with 500 cc. of saturated sodium chloride solution, and dried over anhydrous sodium sulfate. Upon concentration of the ether solution, there was obtained 30.34 g. of 17α-methyl-2,5(10)-estradiene-3,17β-diol 3-methyl ether, M.P. 132–141° C. when recrystallized from ether.

By replacement in the preceding preparation of the 17α-methyl-3,17β-estradiol 3-methyl ether by a molar equivalent amount of 17α-propyl-3,17β-estradiol 3-methyl ether, 17α-isopropyl-3,17β-estradiol 3-methyl ether, or 17α-butyl-3,17β-estradiol 3-methyl ether (prepared by reacting estrone methyl ether with propylmagnesium halide, isopropylmagnesium halide, or butylmagnesium halide, respectively), there can be obtained, respectively, 17α-propyl-2,5(10)-estradiene-3,17β-diol 3-methyl ether [IV; R is $(CH_2)_2CH_3$], 17α-isopropyl-2,5(10)-estradiene-3,17β-diol 3-methyl ether [IV; R is $CH(CH_3)_2$], or 17α-butyl-2,5(10)-estradiene-3,17β-diol 3-methyl ether [IV; R is $(CH_2)_3CH_3$].

(b) *17α - methyl-19-nor-5(10)-androsten-17β-ol-3-one* [I; X is O, R is CH₃].—A solution of 10.08 g. (0.08 mole) of oxalic acid dihydrated in 120 cc. of water was added to a solution of 6.04 g. (0.02 mole) of 17α-methyl-2,5(10)-estradiene-3,17β-diol 3-methyl ether in 600 cc. of methanol. The reaction mixture was allowed to stand for forty minutes at room temperature and then was diluted with 4 liters of water. The solution was extracted twice with 1000 cc. of 2% sodium bicarbonate solution and then washed with 500 cc. of saturated sodium chloride solution. The aqueous layers were back extracted with 1 liter of ether which was in turn washed with 200 cc. of saturated sodium chloride solution. The combined organic extracts were dried over anhydrous sodium sulfate and concentrated by distillation. There was thus obtained 5.60 g. of 17α-methyl-19-nor-5(10)-androsten-17β-ol-3-one, M.P. 122–134° C., which when recrystallized successively from an ethyl acetate-hexane mixture, ethyl acetate and finally from ether was obtained in the form of colorless prisms, M.P. 140–144.5° C. (corr.);

$[\alpha]_D^{25} = +145.7°$ (1% in chloroform;) ultraviolet maxima at 278 and 287 mμ.

*Analysis.*—Calcd. for $C_{19}H_{28}O_2$: C, 79.12; H, 9.79. Found: C, 79.40; H, 9.67.

A mixed melting point of the 17α-methyl-19-nor-5(10)-androsten-17β-ol-3-one obtained above with 17α-methyl-19-nor-testosterone, M.P. 150.5–157.5° C. (corr.) showed a depression to 129–138° C.

By replacement in the preceding preparation of the 17α-methyl-2,5(10)-estradiene-3,17β-diol 3-methyl ether by a molar equivalent amount of 17α-propyl-2,5(10)-estradiene-3,17β-diol 3-methyl ether, 17α-isopropyl-2,5(10)-estradiene-3,17β-diol 3 methyl ether, or 17α-butyl-2,5(10)-estradiene-3,17β-diol 3-methyl ether, there can be obtained, respectively 17α-propyl-19-nor-5(10)-androsten-17β-ol-3-one [I; X is O, R is $(CH_2)_2CH_3$], 17α-isopropyl-19-nor-5(10)-androsten-17β-ol-3-one [I; X is O, R is $CH(CH_3)_2$], or 17α-butyl-19-nor-5(10)-androsten-17β-ol-3-one [I; X is O, R is $(CH_2)_3CH_3$].

EXAMPLE 2

(a) *17α-ethyl-3,17β-estradiol 3-methyl ether* [III; R is C₂H₅].—A solution of 6.21 g. (0.02 mole) of 17α-ethynyl-3,17β-estradiol 3-methyl ether, M.P. 152–152.5° C., in 200 cc. of ethanol was hydrogenated in the presence of 0.5 g. of 22% palladium hydroxide on strontium carbonate catalyst at room temperature and an initial pressure of 58 lbs. per sq. inch. After the calculated quantity of hydrogen had been taken up, the reaction mixture was filtered, the filtrate concentrated and the residue recrystallized from methanol, giving 17α-ethyl-3,17β-estradiol 3-methyl ether, M.P. 100–104° C.

(b) *17α - ethyl-2,5(10)-estradiene-3,17β-diol 3-methyl ether* [IV; R is C₂H₅] was prepared from 10.00 g. of 17α-ethyl-3,17β-estradiol 3-methyl ether, 6.00 g. of lithium and 1000 cc. of liquid ammonia according to the manipulative procedure described above in Example 1, part (a). The product was recrystallized from ether giving 6.18 g. of 17α-ethyl-2,5(10)-estradiene-3,17β-diol 3-methyl ether, M.P. 116.5–124° C.

(c) *17α-ethyl-19-nor-5(10)-androsten-17β-ol-3-one* [I; X is O, R is C₂H₅] was prepared from 6.18 g. of 17α-ethyl-2,5(10)-estradiene-3,17β-diol 3-methyl ether and 5.80 g. of oxalic acid dihydrate according to the manipulative procedure described above in Example 1, part (b). The product was dissolved in pentane containing 10% ether and chromatographed on a column of 300 g. of silica gel. The column was eluted with pentane-ether mixtures of increasing ether content. Pentane containing 40% ether brought out 2.72 g. of 17α-ethyl-19-nor-5(10)-androsten-17β-ol-3-one, colorless prisms, M.P. 134.5–138.5° C. (corr.) when recrystallized from ethyl acetate and dried in vacuo at 80° C. for thirteen hours;

$[\alpha]_D^{25} = +160.5° \pm 0.1°$ (1% in chloroform); ultraviolet maximum at 282 mμ.

*Analysis.*—Calcd. for $C_{20}H_{30}O_2$: C, 79.42; H, 10.00. Found: C, 79.73; H, 9.83.

EXAMPLE 3

*17α-methyl-19-nor-5(10)-androstene-3,17β-diol* [I; X is OH, R is CH₃].—A suspension of 3.79 g. (0.100 mole) of lithium aluminum hydride in 100 cc. of ether was stirred for one hour. There was then added over a period of one and one-half hours a solution of 4.17 g. (0.0145 mole) of 17α-methyl-19-nor-5(10)-androsten-17β-ol-3-one in 175 cc. of ether. The reaction mixture was stirred for one hour, refluxed for four hours and allowed to stand at room temperature overnight. Ethyl acetate (30 cc.) was then added during one hour, and the mixture was stirred for two hours at room temperature and poured into 1 liter of ice water containing 50 cc. of concentrated hydrochloric acid. The product was extracted with ethyl acetate, and the extracts were washed with saturated sodium chloride solution and dried over anhydrous sodium sulfate. The dried solution was concentrated and recrystallized from ethyl acetate and from methanol, giving 2.39 g. of 17α-methyl-19-nor-5(10)-androstene-3,17β-diol in the form of colorless prisms, M.P. 168–172° C. (corr.); $[\alpha]_D^{25} = +131.0°$ (1% in chloroform).

*Analysis.*—Calcd. for $C_{19}H_{30}O_2$: C, 78.57; H, 10.41. Found: C, 78.53; H, 10.20.

By replacement in the preceding preparation of the 17α-methyl-19-nor-5(10)-androsten-17β-ol-3-one by a molar equivalent amount of 17α-ethyl-19-nor-5(10)-androsten-17β-ol-3-one, 17α-propyl-19-nor-5(10)-androsten-17β-ol-3-one, 17α-isopropyl-19-nor-5(10)-androsten-17β-ol-3-one, or 17α-butyl-19-nor-5(10)-androsten-17β-ol-3-one, there can be obtained, respectively, 17α-ethyl-19-nor-5(10)-androstene-3,17β-diol [I; X is OH, R is $C_2H_5$], 17α-propyl-19-nor-5(10)-andostene-3,17β-diol [I; X is OH, R is $(CH_2)_2CH_3$], 17α-isopropyl-19-nor-5(10)-androstene-3,17β-diol [I; X is OH, R is $CH(CH_3)_2$], or 17α-butyl-19-nor-5(10)-androstene-3,17β-diol [I; X is OH, R is $(CH_2)_3CH_3$].

The compounds of our invention possess useful estrogenic activity. For example, 17α-methyl-19-nor-5(10)-androstene-3,17β-diol, was found to be stimulating as an estrogen at dose levels of 0.25–6.25 mg. per kg. per day.

The compounds of the invention can be prepared for use by dispersing them in an aqueous suspension by means of detergents and thickening agents, or by dissolving them in a therapeutically acceptable oil or oil-water emulsion for parenteral administration.

We claim:

1. A 17α-(lower-alkyl)-19-nor-5(10)-androstene-3,17β-diol.
2. 17α-methyl-19-nor-5(10)-androstene-3,17β-diol.

References Cited in the file of this patent

UNITED STATES PATENTS

| | | |
|---|---|---|
| 2,843,608 | Colton | July 15, 1958 |
| 2,905,676 | Colton | Sept. 22, 1959 |